(No Model.)
J. A. HEMS.
BRAKE FOR BICYCLES.
No. 425,789. Patented Apr. 15, 1890.
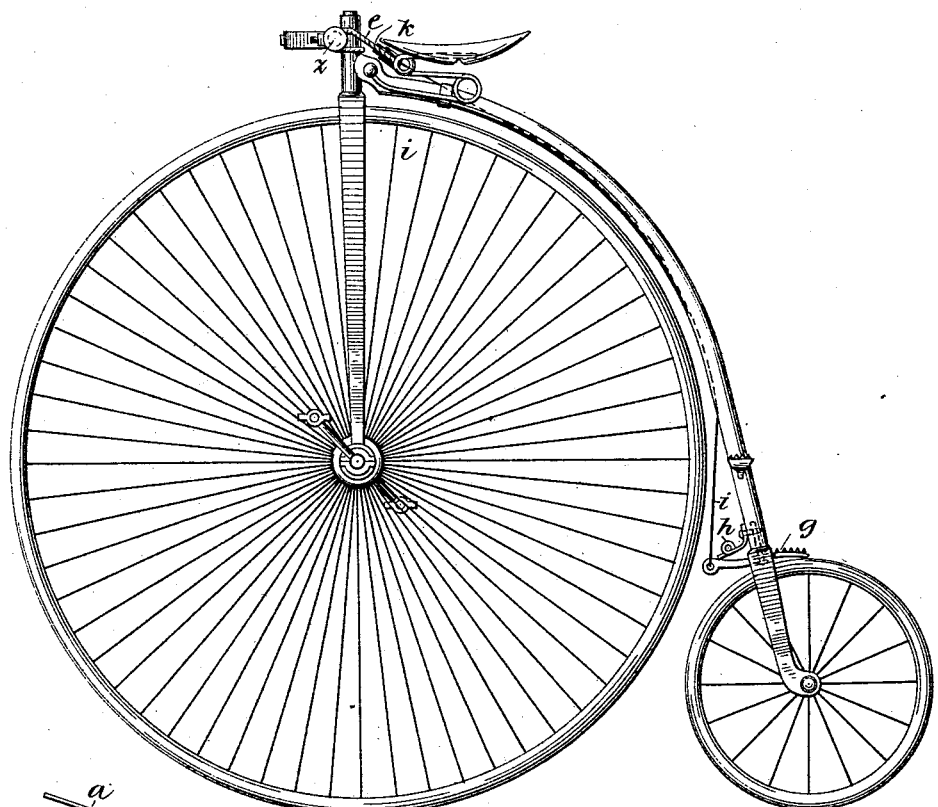
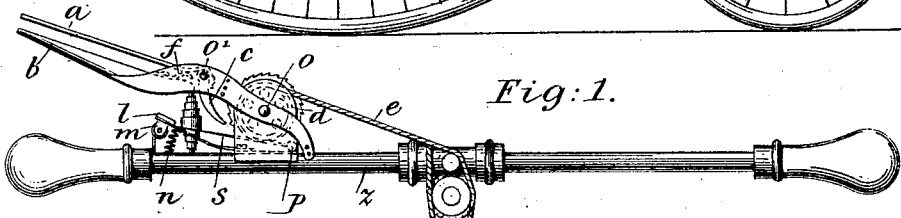
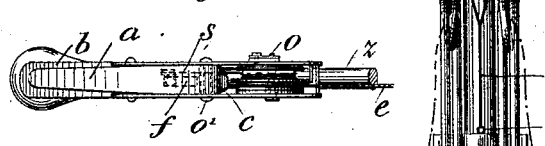
WITNESSES:
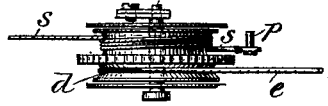
INVENTOR:
Attorney.

UNITED STATES PATENT OFFICE.

JAN AUGUST HEMS, OF MERAN, AUSTRIA-HUNGARY.

BRAKE FOR BICYCLES.

SPECIFICATION forming part of Letters Patent No. 425,789, dated April 15, 1890.

Application filed February 2, 1889. Serial No. 298,507. (No model.) Patented in England December 1, 1888, No. 17,524; in Switzerland December 1, 1888, No. 143; in Germany December 2, 1888, No. 48,195; in France December 4, 1888, No. 194,574; in Belgium December 4, 1888, No. 84,176, and in Austria-Hungary March 28, 1889, No. 49,263 and No. 7,873.

*To all whom it may concern:*

Be it known that I, JAN AUGUST HEMS, of the town of Meran, in the Austro-Hungarian Empire, have invented a certain new and useful Improved Brake Device for the Rear Wheel of Bicycles, (for which a patent has been granted in Great Britain, No. 17,524, dated December 1, 1888; in Switzerland, No. 143, dated December 1, 1888; in Germany, No. 48,195, dated December 2, 1888; in France, No. 194,574, dated December 4, 1888; in Belgium, No. 84,176, dated December 4, 1888, and in Austria-Hungary, No. 49,263 and No. 7,873, dated March 28, 1889,) of which I declare the following to be a specification.

My invention relates to that class of brakes for bicycles wherein the brake is applied to the rear wheel of the same, the brake-block being set on the wheel through the medium of a flexible connector; and the object of the invention is to provide improved means whereby the rider may conveniently set and release the brake.

The invention will be fully described hereinafter, and its novel features carefully defined in the claims.

In the accompanying drawings, Figure 1 is a top view of the device for operating the brake. Fig. 2 represents the same in elevation. Fig. 3 is a detail of the pulley on an enlarged scale. Fig. 4 is the elevation of the bicycle with the complete brake device.

Like letters indicate like parts in all the figures.

If the lever $a$, which turns around the fulcrum $o$ and is held in its extreme position by the weak spring $f$, is pressed toward the lever $b$, the lower end of the pawl $c$, connected to the same, will gear into the toothing of the rope-drum $d$, arranged on the same axle with the lever $b$, but moving independent of the said lever $d$. If now both levers $a$ and $b$ are pressed against the volute spring $f'$ and toward the steering-rod $z$, the rope or chain drum $d$ is moved on its axle by means of the pawl $c$, and the cords, ropes, or chains, the ends of which are fixed to the drum, are wound onto the same. The cord, rope, or chain $e$ is at its opposite end fixed to the head of the bicycle. The brake-block $g$ is arranged above the small rear wheel and has its bearings in the frame-rail, said brake-block being held in normal condition—that is, out of contact with the rear wheel—by means of a spring $h$.

A strong cord, wire, or chain $i$ runs from the eye of the brake-block $g$ through the hollow backbone upward, passes beneath the saddle, or thereabout, through an opening $i'$, and is so connected to the eye of the pulley $k$ that when the rope-drum $d$ is rotated and the cord, chain, &c., of the same begins to be wound onto the said drum the wire, cord, or chain $i$ will be put under tension and the brake-block $g$ applied to the wheel with a force proportionate to the original tension of the cord $e$ and the wire $i$, for which the two levers $a$ and $b$ are pressed two or three times against the volute spring $f'$ in the direction of the steering lever or rod.

The cylindrical part of the rope-drum $d$ is divided into two parts by a toothed wheel or flange, which is preferably made in one piece with the drum-cylinder, one of such said parts serving to receive the cord, rope, or chain to be rolled upon the said drum, while a good cord of a very thin conically-twisted wire rope $s$ is laid around the other half and is fixed at its thicker end to the bearing of the rope-drum at $p$, the other thinner end being led over a small roller $m$ on the lower side of the spring $l$, and then firmly connected to the steering-rod.

In order that the conically-twisted wire rope $s$ may retain its tension, so that when the rope or chain $e$ has been repeatedly wound onto the rope-drum by operating the levers $a$ and $b$, and the tension of the wire rope therefore successively increased, a retrograde movement of the toothed flange or the whole drum is prevented when the pawl $c$ is operated, a second spring $n$ of sufficient strength is inserted between the leaf-spring $l$ and handle-bar in such manner that the wire rope $s$ will be held continuously under tension by the pressure exerted on the roller $m$.

The operation of the apparatus is as follows: If the levers $a$ and $b$ are pressed together and then against the spring $f'$ in the direction of the steering-rod, the rope or cord $e$ will, according to the number of times the levers are operated, be wound onto the drum $d$, and consequently the wire rope or chain $i$, attached to the pulley $k$, be subjected to increasing tension and the brake-block firmly pressed against the tire of the wheel to be braked. A premature retrograde movement of the brake-block $g$ cannot take place in consequence of the friction of the coils of rope on the drum $d$, and the conically-twisted wire $s$ being firmly held under tension by the operation of the springs $l$ and $n$. A slight pressure on the springs $l$ and $n$ will release the wire rope $s$ from tension and its friction with the rope-drum $d$ and release the brake-block from its grip on the rear wheel of the bicycle.

Should by any emergency one of the parts of the apparatus break during the braking or not act promptly, the bicyclist can apply the brake-block $g$ by treading on the same.

Having now particularly described and ascertained the nature of my said invention and in what manner the same is to be performed, I declare that what I claim is—

1. The combination, with the wheels and frame of a bicycle or like vehicle, of a brake mechanism comprising a brake-block to bear on the vehicle-wheel, a rope-drum provided with a ratchet, a flexible connector between said drum and the brake-block, whereby when said connector is wound on the drum the brake will be set, the braking-levers $a$ and $b$, springs for retracting said levers, and a pawl $c$, carried by lever $a$ and adapted to engage the drum-ratchet when the said levers are operated, substantially as set forth.

2. The combination, with the wheels and frame of a bicycle or like vehicle, of a brake mechanism comprising a brake-block to bear on the vehicle-wheel, a rope-drum provided with a ratchet, a flexible connector between said drum and the brake-block, whereby when said connector is wound on the drum the brake will be set, a pawl adapted to engage the drum-ratchet, an operating-lever to which said pawl is attached, a spring for retracting said lever and pawl, whereby the pawl is disengaged from the ratchet, and an automatic spring-brake on said drum to prevent premature back rotation, substantially as set forth.

3. The combination, with the wheels and frame of a bicycle or like vehicle, of a brake mechanism comprising a brake-block to bear on the vehicle-wheel, a rope-drum $d$, provided with a ratchet, a flexible connector between said brake-block and the drum, whereby the winding of the connector on said drum sets the brake, a pawl and lever adapted for rotating said drum by intermittent impulses, a spring which holds said pawl out of engagement with the drum-ratchet normally, and a brake on said drum to prevent premature back rotation, said drum-brake consisting of a wire rope $s$, wound about a part of drum $d$ and fixed at its ends, a roller $m$, which bears on said rope $s$, and the spring $l$, which carries said roller $m$, substantially as set forth.

4. The combination, with the wheels and frame of a bicycle, of the brake-block $g$, adapted to bear on the rear wheel of the vehicle, the brake-wire $i$, connected with the brake-block at one end, passing through the hollow in the backbone, and provided at its other end with a pulley $k$, the brake-rope $e$, attached at one end to the frame, embracing the pulley $k$, and secured at its other end to the drum $d$, the said drum provided with a ratchet, the operating lever and pawl adapted for intermittently rotating said drum $d$, and the automatic spring-brake on said drum to prevent premature back rotation, substantially as set forth.

In witness whereof I have hereunto signed my name in the presence of two subscribing witnesses.

JAN AUGUST HEMS.

Witnesses:
OTTO SCHIFFER,
VICTOR TISCHLER.